(12) United States Patent
Saito et al.

(10) Patent No.: US 7,535,290 B2
(45) Date of Patent: May 19, 2009

(54) AM RADIO RECEIVING CIRCUIT

(75) Inventors: Yasuji Saito, Gunma (JP); Masanori Kudo, Gunma (JP)

(73) Assignee: Sanyo Electric Co., Ltd., Osaka (JP)

( * ) Notice: Subject to any disclaimer, the term of this patent is extended or adjusted under 35 U.S.C. 154(b) by 103 days.

(21) Appl. No.: 11/458,623

(22) Filed: Jul. 19, 2006

(65) Prior Publication Data

US 2007/0018868 A1    Jan. 25, 2007

(30) Foreign Application Priority Data

Jul. 19, 2005    (JP) .............................. 2005-208652

(51) Int. Cl.
*H03D 1/00*    (2006.01)

(52) U.S. Cl. .................. 329/349; 329/347; 375/346; 455/303

(58) Field of Classification Search ................. 329/347, 329/349; 455/334, 303; 375/346
See application file for complete search history.

(56) References Cited

U.S. PATENT DOCUMENTS

| | | | |
|---|---|---|---|
| 5,095,534 A | 3/1992 | Hiyama | |
| 5,583,891 A * | 12/1996 | Espe et al. | 375/346 |
| 5,794,136 A * | 8/1998 | Buchwald et al. | 455/334 |

FOREIGN PATENT DOCUMENTS

JP    2001-186031    7/2001

* cited by examiner

*Primary Examiner*—Arnold Kinkead
(74) *Attorney, Agent, or Firm*—SoCal IP Law Group LLP; Steven C. Sereboff; John E. Gunther (57) ABSTRACT

An AM radio receiving circuit is disclosed that comprises a front end circuit that converts an input AM modulation signal to an intermediate frequency signal that in turn is output; a pulse noise detecting circuit that detects pulse noise included in the AM modulation signal; a pulse noise removing circuit that removes the pulse noise included in the intermediate frequency signal output from the front end circuit based on the detection result of the pulse noise detecting circuit to output the signal; and a detecting circuit that detects the intermediate frequency signal output from the pulse noise removing circuit after removing the pulse noise to output an audio signal.

11 Claims, 6 Drawing Sheets

AM RADIO RECEIVING CIRCUIT

CROSS-REFERENCE TO RELATED APPLICATIONS

This application claims the benefit of priority to Japanese Patent Application No. 2005-208652, filed Jul. 19, 2005, of which full contents are incorporated herein by reference.

BACKGROUND OF THE INVENTION

1. Field of the Invention

The present invention relates to an AM radio receiving circuit.

2. Description of the Related Art

An AM radio receiving circuit generally removes pulse noise included in a received AM modulation signal. For example, Japanese Patent Application Laid-Open Publication No. 2001-186031 discloses an AM radio receiving circuit that removes pulse noise after a detecting circuit converts an intermediate frequency signal to an audio signal.

Figure 7:
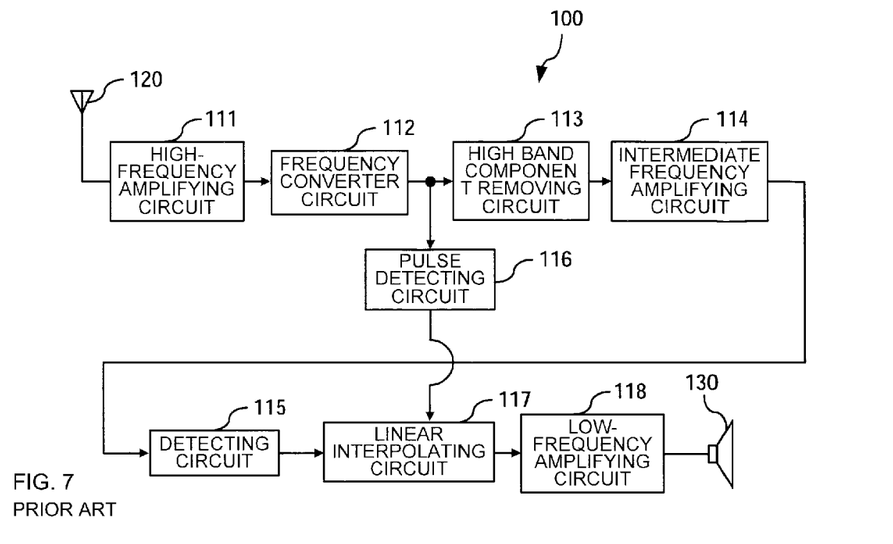
FIG. 7 shows a typical configuration example of an AM radio receiving circuit that removes pulse noise after detection.

FIG. 7 shows a typical configuration example of an AM radio receiving circuit that removes pulse noise after detection. An AM radio receiving circuit 100 is constituted by including a high-frequency amplifying circuit 111, a frequency converter circuit 112, a high band component removing circuit 113, an intermediate-frequency amplifying circuit 114, a detecting circuit 115, a pulse detecting circuit 116, a linear interpolating circuit 117, and a low-frequency amplifying circuit 118.

The high-frequency amplifying circuit 111 amplifies an AM modulation signal received through an antenna 120 and outputs the signal. The frequency converter circuit 112 converts an amplified high-frequency signal to an intermediate frequency signal and outputs the signal. The high band component removing circuit 113 removes a high band component included in the intermediate frequency signal and outputs the signal. The intermediate-frequency amplifying circuit 114 amplifies and outputs the intermediate frequency signal.

The detecting circuit 115 takes out and outputs an audio signal from the intermediate frequency signal. The pulse detecting circuit 116 detects and outputs a section including pulse noise based on the intermediate frequency signal output from the frequency converter circuit 112. The linear interpolating circuit 117 performs a linear interpolation process based on the detection result of the pulse detecting circuit 116 for the audio signal output from the detecting circuit 115 to remove noise and outputs the audio signal. The low-frequency amplifying circuit 118 amplifies lower frequencies of the noise-removed audio signal to output sound from a speaker 130.

Figure 8A:
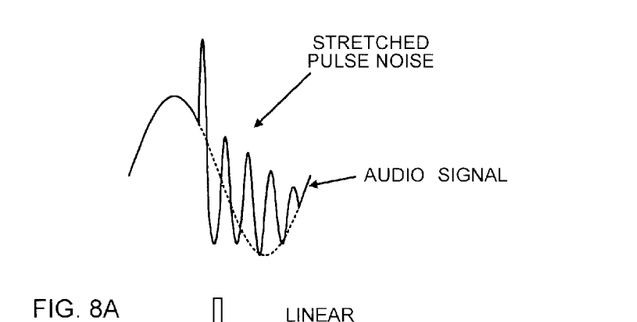
FIGS. 8A and 8B show waveforms of an audio signal including the stretched pulse noise and an audio signal after the linear interpolation.
Figure 8B:
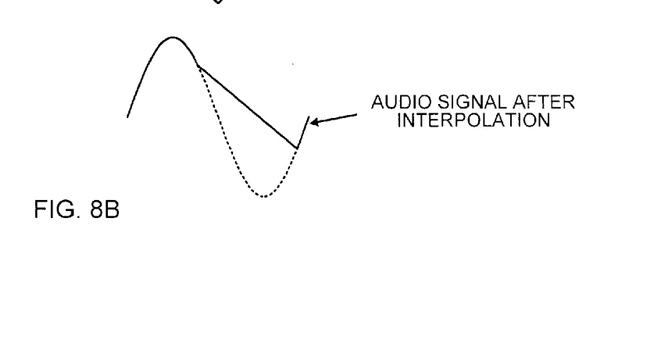

By the way, when the pulse noise included in the AM modulation signal goes through processes such as the detection, the noise generation section is stretched. FIGS. 8A and 8B show waveforms of an audio signal including the stretched pulse noise and an audio signal after the linear interpolation. As shown in FIG. 8A, if the pulse noise is stretched, a section to be interpolated becomes long. Therefore, if the linear interpolation process is performed for such an audio signal, the processing amount of the interpolation process is increased and the interpolated waveform is distorted as shown in FIG. 8B, which deteriorates the sound quality.

SUMMARY OF THE INVENTION

The present invention was conceived in consideration of the above problems and it is therefore an object thereof to provide an AM radio receiving circuit that can improve a distortion rate of an audio signal and reduce a process amount of an interpolation process.

In order to achieve the above object, according to an aspect of the present invention there is provided an AM radio receiving circuit comprising a front end circuit that converts an input AM modulation signal to an intermediate frequency signal that in turn is output; a pulse noise detecting circuit that detects pulse noise included in the AM modulation signal; a pulse noise removing circuit that removes the pulse noise included in the intermediate frequency signal output from the front end circuit based on the detection result of the pulse noise detecting circuit to output the signal; and a detecting circuit that detects the intermediate frequency signal output from the pulse noise removing circuit after removing the pulse noise to output an audio signal. The AM radio receiving circuit may further comprise a high band component removing circuit that removes a high band component included in the intermediate frequency signal output from the front end circuit to output the signal, wherein the pulse noise removing circuit removes the pulse noise included in the intermediate frequency signal output from the high band component removing circuit to output the signal.

In order to achieve the above object, according to another aspect of the present invention there is provided an AM radio receiving circuit comprising a front end circuit that converts an input AM modulation signal to an intermediate frequency signal, which is output; an adjacent component detecting circuit that detects an adjacent component included in the intermediate frequency signal; an adjacent component removing circuit that removes the adjacent component included in the intermediate frequency signal output from the front end circuit based on the detection result of the adjacent component detecting circuit to output the signal; a pulse noise detecting circuit that detects pulse noise included in the AM modulation signal; a pulse noise removing circuit that removes the pulse noise included in the intermediate frequency signal output from the adjacent component removing circuit based on the detection result of the pulse noise detecting circuit to output the signal; and a detecting circuit that detects the intermediate frequency signal output from the pulse noise removing circuit after removing the pulse noise to output an audio signal. The AM radio receiving circuit may further comprise a high band component removing circuit that removes a high band component included in the intermediate frequency signal output from the front end circuit to output the signal, wherein the adjacent component removing circuit removes the adjacent component included in the intermediate frequency signal output from the high band component removing circuit to output the signal. In the AM radio receiving circuit, the pulse noise detecting circuit may detect and output the section generating the pulse noise in the AM modulation signal, and the pulse noise removing circuit may perform a linear interpolation process for the section detected by the pulse noise detecting circuit in the intermediate frequency signal to output the signal. The pulse noise detecting circuit may detect and output the section generating the pulse noise based on the intermediate frequency signal output from the front end circuit.

The above and other features of the present invention will become more apparent from the descriptions of the accompanying drawings and of this specification.

BRIEF DESCRIPTION OF THE DRAWINGS

To understand the present invention and the advantages thereof more thoroughly, the following description should be referenced along with the accompanying drawings.

DETAILED DESCRIPTION OF THE INVENTION

From the descriptions of this specification and of the accompanying drawings, at least the following details will become apparent.

First Embodiment

Figure 1:
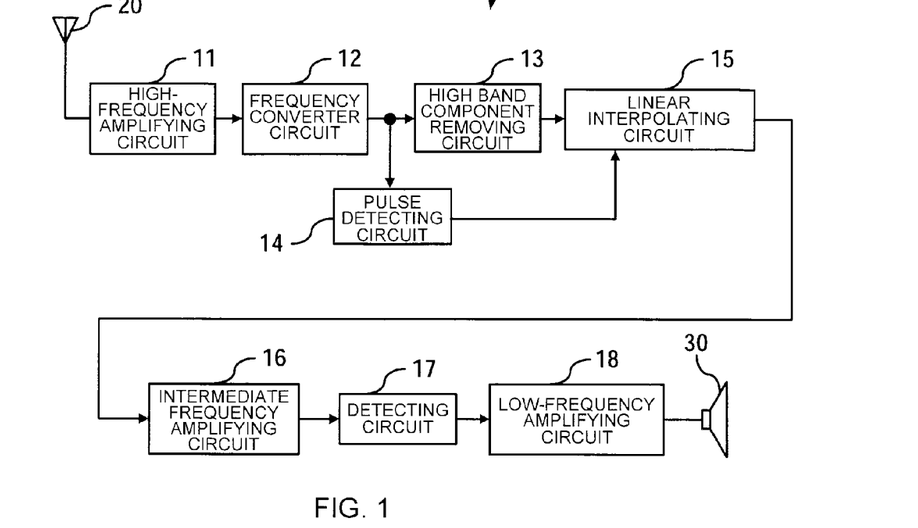
FIG. 1 shows a configuration of an AM radio receiving circuit that is a first embodiment of the present invention.

==Circuit Configuration==
FIG. 1 shows a configuration of an AM radio receiving circuit that is a first embodiment of the present invention. An AM radio receiving circuit 1 is constituted by including a high-frequency amplifying circuit 11, a frequency converter circuit 12, a high band component removing circuit 13, a pulse detecting circuit (a pulse noise detecting circuit) 14, a linear interpolating circuit (pulse noise removing circuit) 15, an intermediate-frequency amplifying circuit 16, a detecting circuit 17, and a low-frequency amplifying circuit 18.

The high-frequency amplifying circuit 11 amplifies a high-frequency AM modulation signal received through an antenna 20 and outputs the signal. The frequency converter circuit 12 converts the amplified AM modulation signal to an intermediate frequency signal and outputs the signal. The high-frequency amplifying circuit 11 and the frequency converter circuit 12 correspond to a front end circuit of the present invention.

The high band component removing circuit 13 removes a high band component included in the intermediate frequency signal and outputs the signal. The pulse detecting circuit 14 detects and outputs a section generating pulse noise in the AM modulation signal based on the intermediate frequency signal output from the frequency converter circuit 12. Although the section generating pulse noise is detected based on the intermediate frequency signal in this embodiment, the section generating pulse noise can be detected based on the AM modulation signal before conversion to the intermediate frequency signal.

The linear interpolating circuit 15 performs a linear interpolation process based on the detection result of the pulse detecting circuit 14 for the section generating pulse noise of the intermediate frequency signal to remove the pulse noise and outputs the signal. The linear interpolating circuit 15 can be constituted by using a pulse noise removal apparatus, etc. disclosed in Japanese Patent Application Laid-Open Publication No. 2001-186031, for example.

The intermediate-frequency amplifying circuit 16 amplifies and outputs the intermediate frequency signal with the pulse noise removed. The detecting circuit 17 detects and converts the intermediate frequency signal to an audio signal, which is output. The low-frequency amplifying circuit 18 amplifies lower frequencies of the audio signal to output sound from a speaker 30.

Figure 2A:
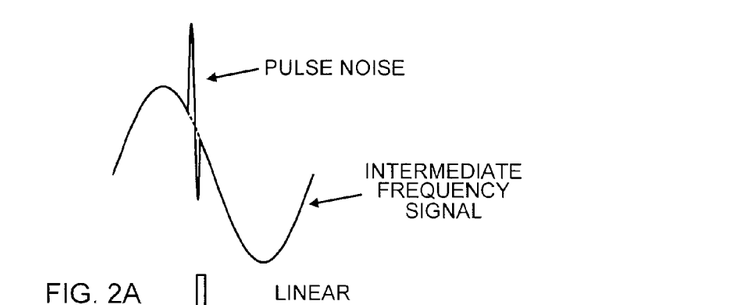
FIGS. 2A and 2B show an example of a linear interpolation process in the AM radio receiving circuit of the first embodiment.
Figure 2B:
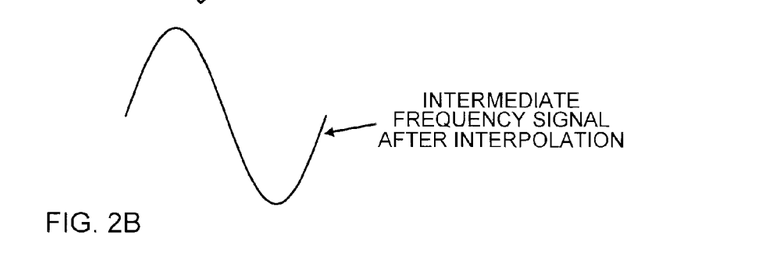

==Linear Interpolation Process==
FIGS. 2A and 2B show an example of the linear interpolation process in the AM radio receiving circuit 1. FIG. 2A shows an example of the intermediate frequency signal including pulse noise. As shown in FIG. 2A, in the intermediate frequency signal, the section generating pulse noise is shorter than the audio signal acquired by performing processes such as the detection while the pulse noise is still included. The linear interpolating circuit 15 performs the linear interpolation process for this section detected by the pulse detecting circuit 14.

FIG. 2B shows the intermediate frequency signal after the linear interpolating circuit 15 performs the linear interpolation process. Since the section generating pulse noise is short as shown in FIG. 2A, the distortion of the signal is smaller when performing the linear interpolation process, as compared to the case that the section generating pulse noise is long. Therefore, the distortion rate of the finally acquired audio signal is improved and the sound quality is enhanced. Since the linear interpolation process is performed for the shorter section, the process load of the interpolation process is alleviated in the linear interpolating circuit 15.

Second Embodiment

==Effect of Adjacent Component==
The first embodiment shows that the distortion rate of the audio signal is improved by performing the linear interpolation process for the intermediate frequency signal before performing the detection process. The intermediate frequency signal may include an adjacent component that is noise due to a signal of an adjacent station.

Figure 3A:
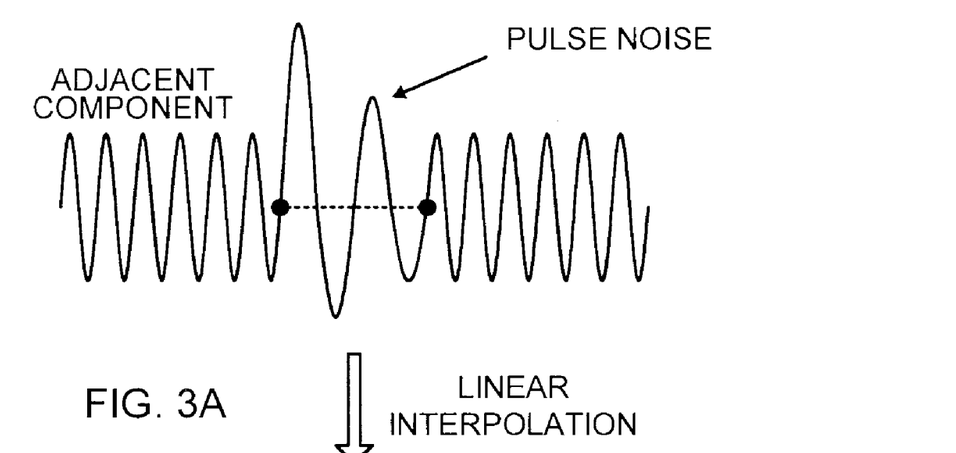
FIGS. 3A to 3C show an example of a signal change when the linear interpolation process is performed for an intermediate frequency signal including an adjacent component.
Figure 3B:
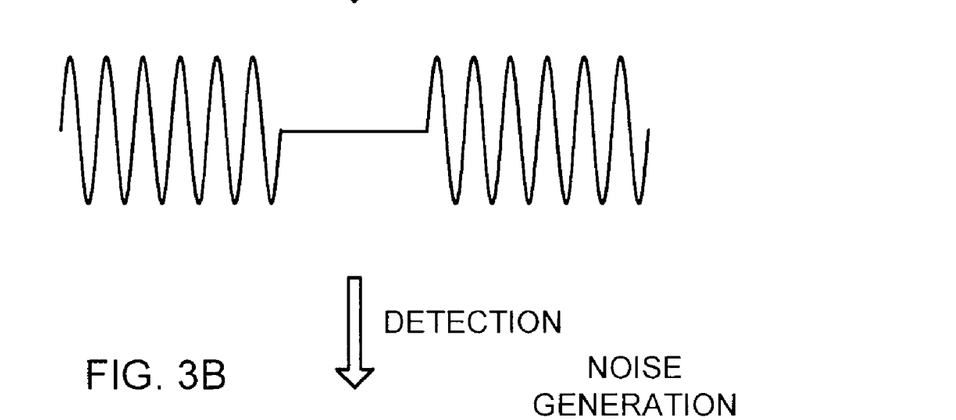
Figure 3C:
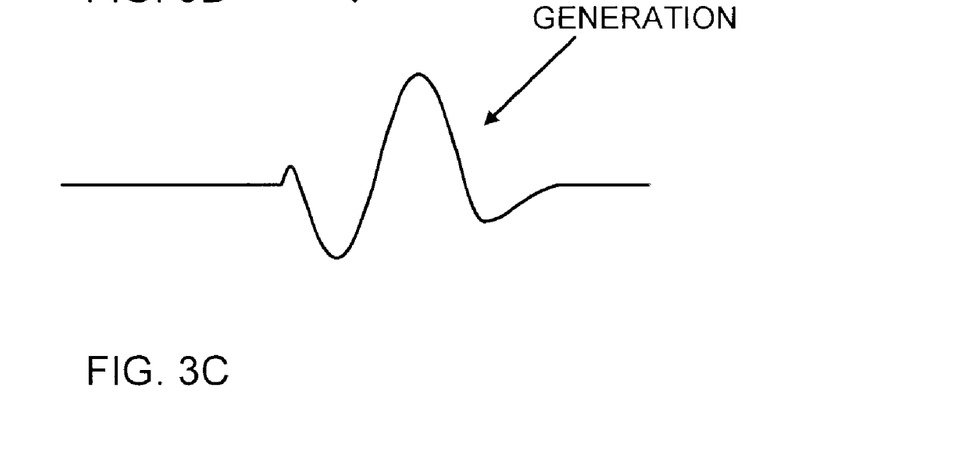

FIGS. 3A to 3C show an example of a signal change when the linear interpolation process is performed for the intermediate frequency signal including the adjacent component. The intermediate frequency signal shown in FIG. 3A includes the adjacent component and the pulse noise. In this case, when the linear interpolation process is performed for the section generating the pulse noise, the waveform of the intermediate frequency signal is as shown in FIG. 3B. If such an intermediate frequency signal is input into the detecting circuit 17, as shown in FIG. 3C, noise is generated by a steep change between the portion including the adjacent component and the linearly interpolated portion.

Figure 4:
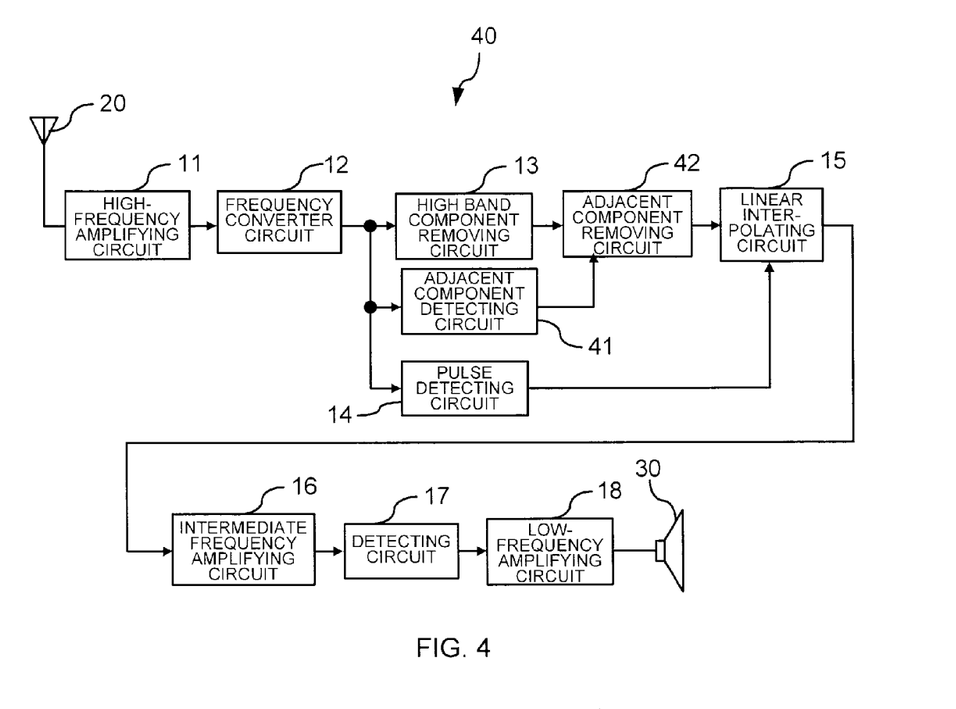
FIG. 4 shows a configuration of an AM radio receiving circuit of a second embodiment.

==Circuit Configuration==
Description will be made of a second embodiment corresponding to the case that such an effect of the adjacent component exists. FIG. 4 shows a configuration of an AM radio receiving circuit that is the second embodiment of the present invention. An AM radio receiving circuit 40 is constituted by including an adjacent component detecting circuit 41 and an adjacent component removing circuit 42 in addition to the AM radio receiving circuit 1 of the first embodiment.

The adjacent component detecting circuit 41 detects and outputs whether the intermediate frequency signal includes the adjacent component or not based on the intermediate frequency signal output from the frequency converter circuit 12. For example, whether the adjacent component is included or not can be determined by determining whether or not a predetermined value is equal to or exceeded by a level of a signal with a center frequency that is the center frequency ±about 10 kHz of the intermediate frequency signal.

If the adjacent component is detected by the adjacent component detecting circuit 41, the adjacent component removing circuit 42 removes the adjacent component included in the intermediate frequency signal output from the high band component removing circuit 13 and outputs the signal. The linear interpolating circuit 15 performs the linear interpolation process for the intermediate frequency signal with the adjacent component removed, which is output from the adjacent component removing circuit 42, and outputs the signal. The adjacent component removing circuit 42 can be constituted by using a narrow-band intermediate frequency filter, etc. disclosed in Japanese Patent Application Laid-Open Publication No. 2001-186031, for example.

==Linear Interpolation Process==

Figure 5A:
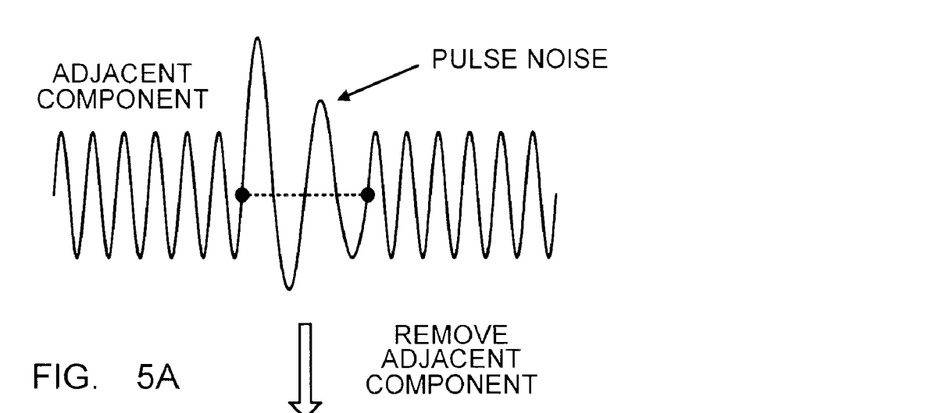
FIGS. 5A to 5D show an example of a linear interpolation process in the AM radio receiving circuit of the second embodiment.
Figure 5B:
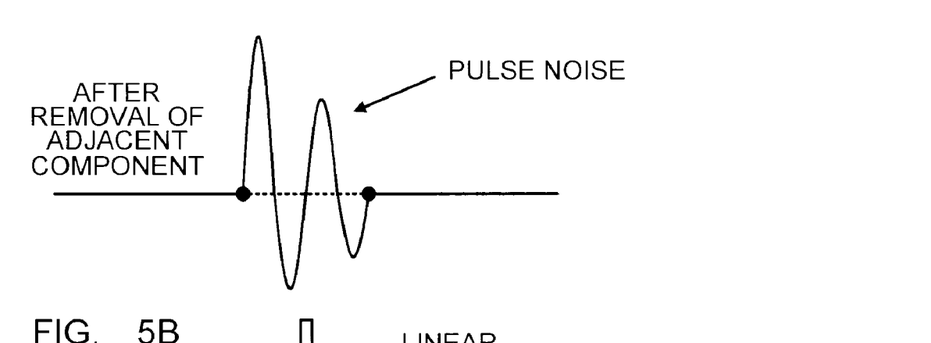
Figure 5C:
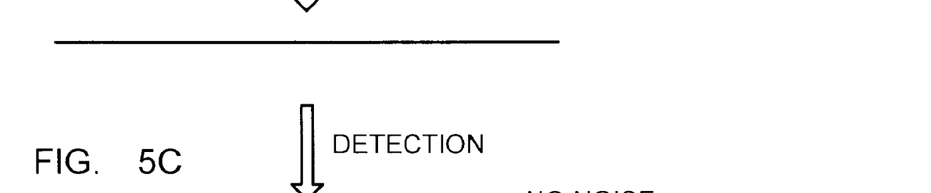
Figure 5D:
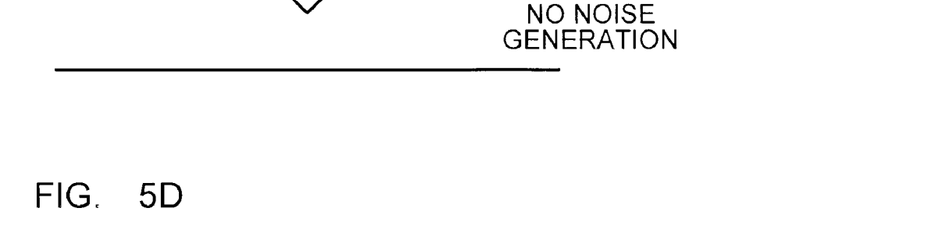

FIGS. 5A to 5D show an example of the linear interpolation process in the AM radio receiving circuit 40. The intermediate frequency signal shown in FIG. 5A includes the adjacent component and the pulse noise. When the adjacent component removing circuit 42 removes the adjacent component from such an intermediate frequency signal, the intermediate frequency signal shown in FIG. 5B can be acquired. When the linear interpolating circuit 15 performs the linear interpolation process for the intermediate frequency signal with the adjacent component removed, the intermediate frequency signal can be acquired which does not include the adjacent component and the pulse noise, as shown in FIG. 5C. Therefore, when this intermediate frequency signal is input into the detecting circuit 17, the audio signal is acquired which is a signal with less distortion, as shown in FIG. 5D.

==Simulation Results==

Figure 6:
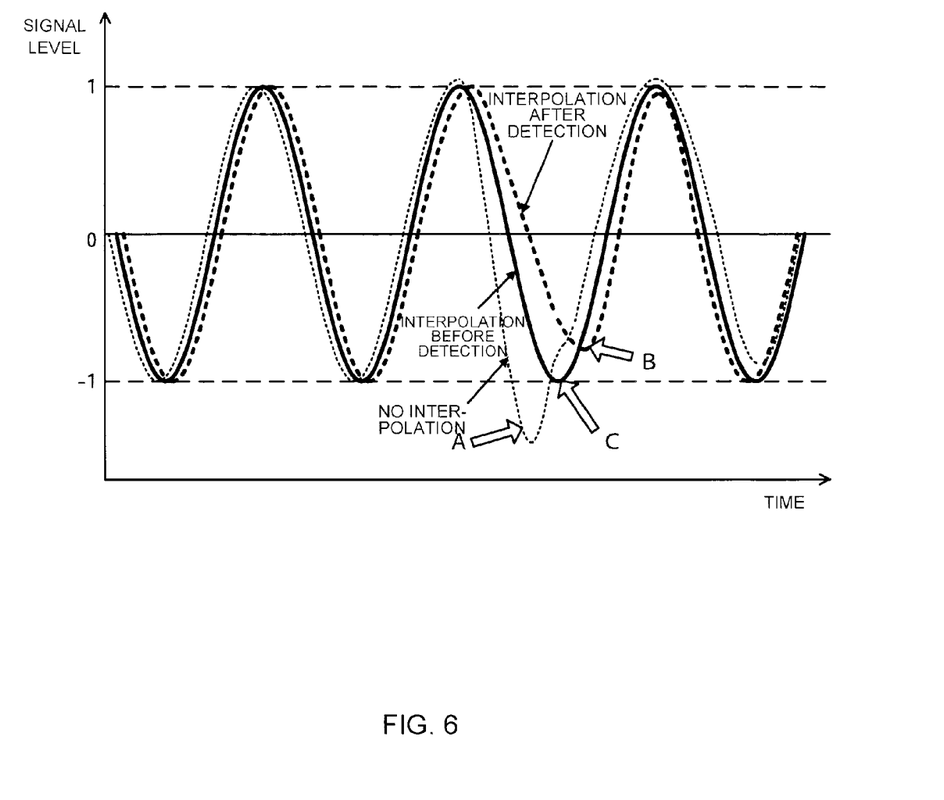
FIG. 6 shows simulation results of the audio signal output from the AM radio receiving circuit, corresponding to presence and absence of the linear interpolation process, etc.

FIG. 6 shows simulation results of the audio signal output from the AM radio receiving circuit, corresponding to presence and absence of the linear interpolation process, etc. In the simulation of FIG. 6, a sine wave with amplitude of one is assumed to be an ideal audio signal that is not affected by noise.

If the linear interpolation process is not performed for removing the pulse noise, a large distortion is generated by the effect of the pulse noise, as shown by a point A of FIG. 6. If the linear process is performed for the detected audio signal in the conventional way, the distortion is generated in the audio signal, as shown by a point B. On the other hand, in the AM radio receiving circuit 40 in this embodiment, the distortion of the acquired audio signal is small and a point C is almost ideal.

Description has been made of the first embodiment and the second embodiment of the AM radio receiving circuits 1, 40 as above. As described above, in the AM radio receiving circuit 1 shown in the first embodiment, since the pulse noise is removed at the stage of the intermediate frequency signal before the detection, the section generating the pulse noise is shorter than that of the case of the removal after the detection, and the distortion of the signal can be constrained after the noise removal. Since the section generating the pulse noise is shorter, the process amount for removing the noise can be reduced.

In the AM radio receiving circuit 40 shown in the second embodiment, the adjacent component is removed before the pulse noise is removed. Therefore, if the adjacent component is included in the intermediate frequency signal, the distortion of the audio signal can be constrained after the detection.

In the AM radio receiving circuits 1, 40, the high band component is removed before removing the noise. Therefore, the distortion can be further constrained in the audio signal acquired by detecting the intermediate frequency signal after the linear interpolation.

Although the linear interpolation process is performed to remove the pulse noise in the AM radio receiving circuits 1, 40, the process removing the pulse noise is not limited to the linear interpolation process and may be a nonlinear interpolation process. In the case on the nonlinear interpolation process, if the pulse noise is stretched, the distortion is also increased in the signal acquired after the interpolation and the process amount of the interpolation process is increased as well. Therefore, by performing the interpolation process before the detection process as shown in the embodiments, the distortion can be constrained in the signal acquired after the interpolation to improve the distortion rate of the audio signal and to reduce the process amount of the interpolation process.

However, since the linear interpolation process has the process amount smaller than the nonlinear interpolation process, the linear interpolation process is more preferable for a process removing the pulse noise included in the AM modulation signal. In the case of the linear interpolation process, since the pulse noise is stretched and the distortion of the audio signal appears more notably, a greater effect can be obtained by performing the interpolation process before the detection process as shown in the embodiments.

Although the embodiments of the present invention have been described as above, the aforementioned embodiments are for the purpose of facilitating the understanding of the present invention and not for the purpose of construing the present invention in a limited manner. The present invention may be changed/altered without departing from the spirit thereof and encompasses the equivalents thereof.

What is claimed is:

1. An AM radio receiving circuit comprising:
   a front end circuit that converts an input AM modulation signal to an intermediate frequency signal, which is output;
   a pulse noise detecting circuit that detects pulse noise included in the AM modulation signal;
   a pulse noise removing circuit that removes the pulse noise included in the intermediate frequency signal output from the front end circuit based on the detection result of the pulse noise detecting circuit to output the signal;
   a detecting circuit that detects the intermediate frequency signal output from the pulse noise removing circuit after removing the pulse noise to output an audio signal; and
   a high band component removing circuit that removes a high band component included in the intermediate frequency signal output from the front end circuit to output the signal,
   wherein the pulse noise removing circuit removes the pulse noise included in the intermediate frequency signal output from the high band component removing circuit to output the signal.

2. An AM radio receiving circuit comprising:

a front end circuit that converts an input AM modulation signal to an intermediate frequency signal, which is output;

an adjacent component detecting circuit that detects an adjacent component included in the intermediate frequency signal;

an adjacent component removing circuit that removes the adjacent component included in the intermediate frequency signal output from the front end circuit based on the detection result of the adjacent component detecting circuit to output the signal;

a pulse noise detecting circuit that detects pulse noise included in the AM modulation signal;

a pulse noise removing circuit that removes the pulse noise included in the intermediate frequency signal output from the adjacent component removing circuit based on the detection result of the pulse noise detecting circuit to output the signal; and a detecting circuit that detects the intermediate frequency signal output from the pulse noise removing circuit after removing the pulse noise to output an audio signal.

3. The AM radio receiving circuit of claim 2, further comprising:

a high band component removing circuit that removes a high band component included in the intermediate frequency signal output from the front end circuit to output the signal, wherein the adjacent component removing circuit removes the adjacent component included in the intermediate frequency signal output from the high band component removing circuit to output the signal.

4. The AM radio receiving circuit of claim 1, wherein the pulse noise detecting circuit detects and outputs the section generating the pulse noise in the AM modulation signal, and wherein the pulse noise removing circuit performs a linear interpolation process for the section detected by the pulse noise detecting circuit in the intermediate frequency signal to output the signal.

5. The AM radio receiving circuit of claim 4, wherein the pulse noise detecting circuit detects and outputs the section generating the pulse noise based on the intermediate frequency signal output from the front end circuit.

6. The AM radio receiving circuit of claim 1, wherein the pulse noise detecting circuit detects and outputs the section generating the pulse noise in the AM modulation signal, and wherein the pulse noise removing circuit performs a linear interpolation process for the section detected by the pulse noise detecting circuit in the intermediate frequency signal to output the signal.

7. The AM radio receiving circuit of claim 6, wherein the pulse noise detecting circuit detects and outputs the section generating the pulse noise based on the intermediate frequency signal output from the front end circuit.

8. The AM radio receiving circuit of claim 2, wherein the pulse noise detecting circuit detects and outputs the section generating the pulse noise in the AM modulation signal, and wherein the pulse noise removing circuit performs a linear interpolation process for the section detected by the pulse noise detecting circuit in the intermediate frequency signal to output the signal.

9. The AM radio receiving circuit of claim 8, wherein the pulse noise detecting circuit detects and outputs the section generating the pulse noise based on the intermediate frequency signal output from the front end circuit.

10. The AM radio receiving circuit of claim 3, wherein the pulse noise detecting circuit detects and outputs the section generating the pulse noise in the AM modulation signal, and wherein the pulse noise removing circuit performs a linear interpolation process for the section detected by the pulse noise detecting circuit in the intermediate frequency signal to output the signal.

11. The AM radio receiving circuit of claim 10, wherein the pulse noise detecting circuit detects and outputs the section generating the pulse noise based on the intermediate frequency signal output from the front end circuit.

* * * * *